United States Patent [19]
Miller et al.

[11] Patent Number: 4,545,075
[45] Date of Patent: Oct. 1, 1985

[54] SATELLITE BLOCK TRANSMISSION USING WIDEBAND FIBER OPTIC LINKS

[75] Inventors: Gary E. Miller; Mohammed F. Mesiya, both of Wallingford; Arthur C. Deichmiller, North Branford, all of Conn.

[73] Assignee: Times Fiber Communications, Inc., Wallingford, Conn.

[21] Appl. No.: 322,659

[22] Filed: Nov. 18, 1981

[51] Int. Cl.⁴ ............................................... H04B 9/00
[52] U.S. Cl. ........................................ 155/612; 455/3; 358/86
[58] Field of Search .................. 343/100 ST, 100 PE, 343/100 CS, 352, 361, 367; 455/3, 6, 7, 12, 13, 600, 610, 612; 370/69.1, 120, 1, 3; 358/86

[56] References Cited
U.S. PATENT DOCUMENTS

| | | |
|---|---|---|
| 3,809,908 | 5/1974 | Clanton . |
| 3,984,824 | 10/1976 | Blckburn . |
| 4,004,078 | 1/1977 | Gorog ................................. 358/83 |
| 4,012,643 | 3/1977 | Miura ................................. 307/237 |
| 4,215,269 | 7/1980 | Kuhn ................................. 455/612 |
| 4,249,264 | 2/1981 | Crochet et al. .................... 455/612 |

OTHER PUBLICATIONS

*TV Communications;* Sep. 1975, pp. 28–34.

Conference Record: International Broadcasting Convention: London, 20–24 Sep. 1976, pp. 228–231.
Microwave System News; Mar. 1981; pp. 74–81.
IEEE Transactions on Cable Television, vol CATV-5, No. 2, Apr. 1980, pp. 50–59.

*Primary Examiner*—Benedict V. Safourek
*Attorney, Agent, or Firm*—Bacon & Thomas

[57] ABSTRACT

A system for transmitting one or more blocks of information signals from the output of a low noise amplifier associated with a satellite antenna to a remote headend or terminal is disclosed. Block conversion is used to translate the signal spectrum from the satellite transmission band, typically 3.7–4.2 GHz, to a frequency range of 0.6–1.1 GHz. A wideband fiber optic link is used to extend the link length from a maximum of 300 feet when coaxial cable is used to approximately 1 km (3281 feet). The output of the optical receiver in the fiber optic link is converted to the original satellite transmission band so that a standard satellite receiver can be used to demodulate the signal. Alternatively, a satellite receiver which interfaces directly at the 0.6–1.1 GHz can be used. The system also may include means to synchronize frequency conversion at each end of the fiber optic link. The high quality of the system lends itself to application in television receive-only as well as date communications.

9 Claims, 5 Drawing Figures

SATELLITE BLOCK TRANSMISSION USING WIDEBAND FIBER OPTIC LINKS

BACKGROUND OF THE INVENTION

The present invention is directed to a system for transmitting one or more blocks of information signals from a satellite antenna to a remote receiver using wideband fiber optic links.

Conventional television-receive-only (TVRO) earth station systems consist of a TVRO antenna which receives one or more high frequency signals directly from a telecommunications satellite, low noise amplifiers (LNAs) which amplify the signals, and coaxial cables which transmit the amplified signals to headend equipment containing a receiver which extracts baseband video and audio signals from the high frequency satellite signals for transmission to subscribers.

Multiple TV channels are transmitted from a satellite in blocks of twelve frequency division multiplexed signals, typically over a 3.7–4.2 GHz band. Current satellites are capable of transmitting twenty-four TV channels in two blocks—a twelve channel, horizontally polarized block and a twelve channel vertically polarized block. Each block is separately received by the satellite antenna, amplified by a LNA and transmitted over coaxial cable to headend equipment comprising the receiver(s) and "on channel" modulators.

However, even when specially designed, high frequency/low loss coaxial cable is employed, the distance over which the channels can be transmitted without repeating is only about 300 feet. Beyond this distance, the quality of the signal degrades rapidly. This fact severely restricts the location of the head-end equipment with respect to the satellite antenna.

SUMMARY OF THE INVENTION

Accordingly, it is an object of the invention to provide a block transmission system for satellite signals which permits separation of the satellite antenna and headend equipment.

Another object of the invention is to provide a block transmission system for satellite systems which can be used in data communications as well as TVRO systems.

Still other objects and advantages of the invention will be apparent to those of skill in the art upon review of the detailed description contained herein.

These objects and advantages are provided by a block transmission system for satellite signals which employs wideband fiber optic links in place of coaxial cable and utilizes a unique frequency conversion scheme to optimize transmission over the fiber optic links. The system comprises a satellite antenna which is capable of receiving at least one block of frequency division multiplexed signals from a telecommunications satellite, a low noise amplifier (LNA) for each block of signals received by said antenna which amplifies the block of signals after it is received, first block conversion means associated with each low noise amplifier which converts the block of signals into a frequency band of 0.6–1.1 GHz, and a wideband fiber optic link connected to each first block conversion means which transmits one 0.6–1.1 GHz block of signals. Second block conversion means associated with each wideband fiber optic link may also be included in the system to receive the 0.6–1.1 GHz block of signals transmitted through the fiber optic link, convert it back to the original block frequency band, and transmit it to receiver means which receives the block of signals from the second block conversion means and converts it to frequencies for ultimate subscriber use in video or data communication. Alternatively, the second block conversion means can be eliminated, in which case the 0.6–1.1 GHz block of signals is transmitted directly to the receiver means. This alternative requires that the receiver means be capable of processing the intermediate frequency block of signals.

BRIEF DESCRIPTION OF THE FIGURES OF DRAWING

DETAILED DESCRIPTION OF THE PREFERRED EMBODIMENTS

Figure 1:
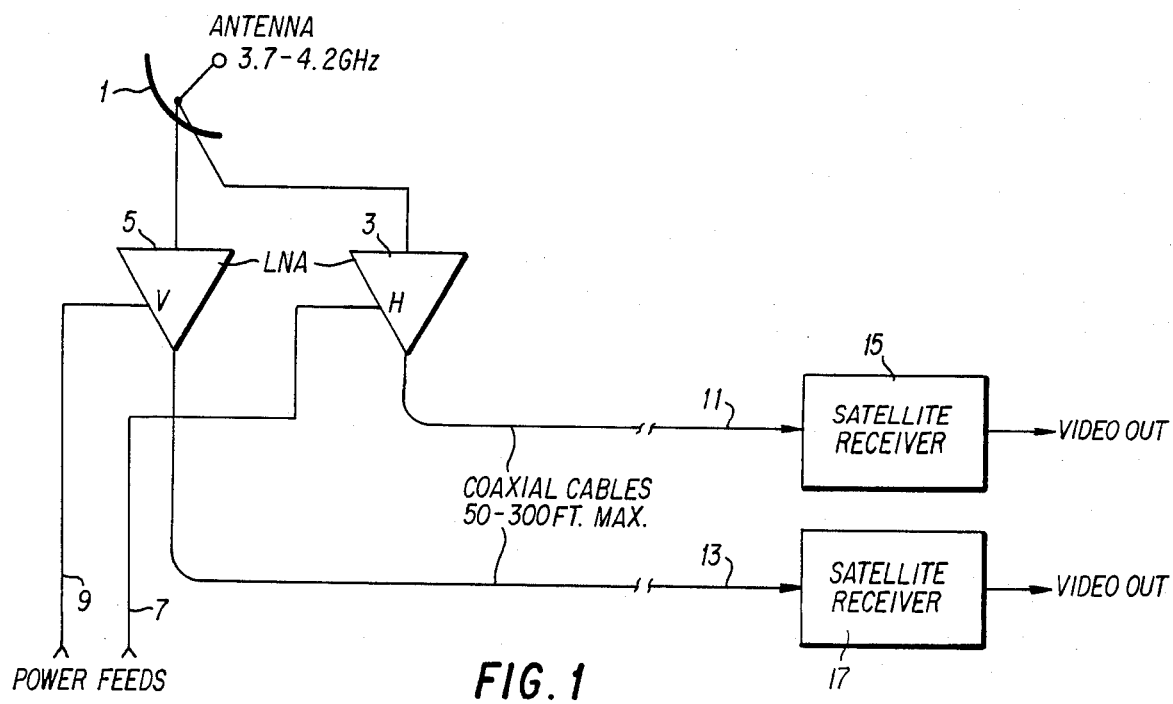
FIG. 1 is a block diagram of a conventional satellite transmission system.

Referring to FIG. 1, a conventional satellite transmission system for television receive only (TVRO) is illustrated in block form. The system includes satellite antenna 1 which receives one or more blocks of high frequency signals, typically in the frequency band of 3.7–4.2 GHz, from a telecommunications satellite. Present technology permits such satellites to transmit a maximum of twenty-four video channels in two blocks of twelve frequency division multiplexed channels. Of course, smaller numbers of signals can also be transmitted. The blocks are transmitted as vertically and horizontally polarized signals to keep them distinct. The blocks of horizontally and vertically polarized signals are received by the antenna and separately detected and amplified by low noise amplifiers (LNA) 3 and 5, respectively. Power feeds 7 and 9 drive the LNAs. The amplified signal blocks are transmitted over high frequency low loss coaxial cable 11 and 13 to satellite receivers 15 and 17, respectively. The receivers convert the high frequency signals to the appropriate video and audio signals which can be processed for reception by subscribers.

Figure 2:
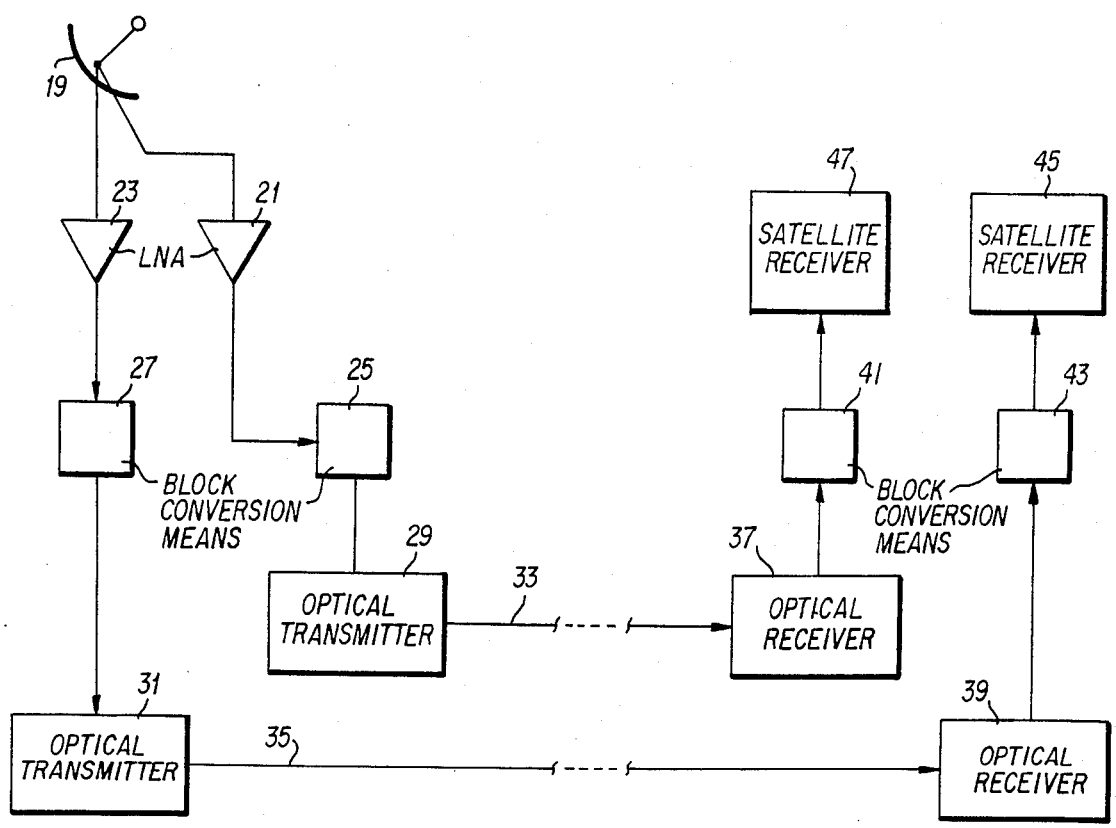
FIG. 2 is a block diagram of a satellite transmission system designed in accordance with the invention.

FIG. 2 illustrates the satellite transmission system of the invention. This system includes satellite antenna 19, which is identical to the satellite antenna used in the conventional system. Low noise amplifiers 21 and 23 also correspond to the conventional LNAs used to amplify the vertically and horizontally polarized signal blocks. However, unlike the conventional systems, the system of the invention contains first block conversion means 25 and 27 which down-convert each block of high frequency signals to an intermediate frequency band of 0.6–1.1 GHz.

The down-converted signals are then used to modulate the output of optical transmitters 29 and 31 in the fiber optic links. While any type of optical transmitter which is capable of transmitting the intermediate frequencies over an optical waveguide approximately 1 km in length may be employed in the system of the invention, injection laser diode (ILD) transmitters which launch intensity modulated signals are most preferred. ILD's with the following specifications have demonstrated adequate performance in model systems:

| | |
|---|---|
| Harmonic Distortion at $m_f$ (intensity modulation depth) = 0.7 | 2nd harmonic −40 dB down<br>3rd harmonic −50 dB down |
| Number of Longitudinal Modes | ≧5 |
| Power coupled into fiber (0.2 NA, 50 μm core) | 1.5 mw |
| Swept Frequency Response | 500–1200 MHz |

To assure the stability of output power with temperature, the ILD is preferrably maintained at constant temperature with the use of a Peletier element. The average output power, $P_{av}$, of the ILD can be held constant by monitoring the rear facet optical power and varying the bias current to compensate for any variation.

The optical signals are launched into optical fiber waveguides 33 and 35 which are preferably low loss (less than 5 dB/km), wideband (greater than 1 GHz/km) waveguides. A graded index optical fiber waveguide is typically required to achieve these characteristics. In most applications, the transportation distances involved will not exceed 1 km (3281 feet).

Optical receivers 37 and 39 detect the fiber output signal and provide an amplified electrical signal in the 0.6–1.1 GHz frequency range. While both avalanche photodiodes (APD) and PIN diodes can be used as the optical receivers, APD receivers are preferred because of the speed of response. One such receiver which has demonstrated adequate performance had the following design specifications:

| | |
|---|---|
| Frequency Response | 500–1200 MHz |
| Flatness | 0.5 dB PP/±18 MHz |
| Gain | 30 dB |
| RMS Equivalent Input Noise Current | 26 pA/$\sqrt{Hz}$ |

This exemplary receiver was designed to achieve low noise and flat frequency response performance.

The 0.6–1.1 GHz electrical signal blocks generated by the optical receiver can be up-converted by second block conversion means 41 and 43 to the original frequency range, typically 3.7–4.2 GHz in satellite video transmission systems, to interface with standard satellite receivers 45 and 47, respectively. Alternatively, the output of the optical receivers can be directly used to interface with a satellite receiver designed for accepting a signal in the 0.6–1.1 GHz range.

The choice of the 0.6–1.1 GHz transmission band is made in view of two conflicting requirements. The first comes from the desirability of operating within an octave of frequency to keep the harmonic components generated when the high frequency signals are down-converted out of band. On the other hand, the current state of fiber optic technology does not favor upper frequency of operation much above 1 GHz.

Figure 3:
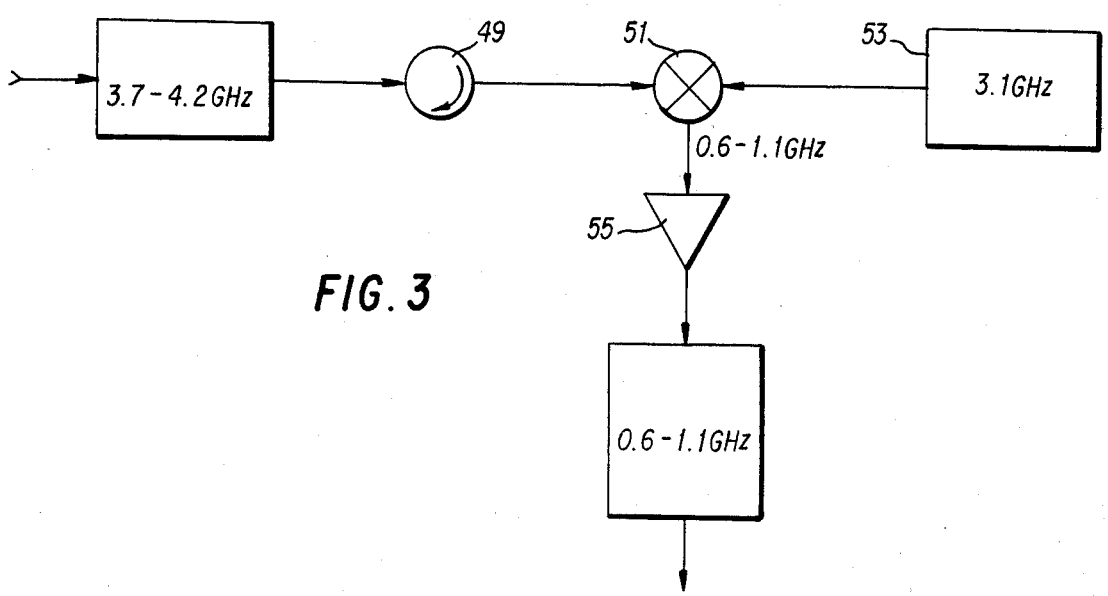
FIG. 3 is a block diagram of a block down-converter for use in the system of the invention.

The design of the block down conversion means is shown in FIG. 3. The high frequency signal block which has been amplified by a LNA is directed to circulator 49 which minimizes reflections due to impedance mismatches over the operating frequency range. From the cirulator, the signal block is transmitted to mixer 51 where it is down-converted by mixing with a signal from local oscillator 53. The frequency of the signal generated by the local oscillator is chosen so that the high frequency block of signals will be down-converted to the 0.6–1.1 GHz range. Thus, for example, the standard satellite transmission frequency band of 3.7–4.2 GHz is mixed with a 3.1 GHz frequency local oscillator signal to generate the intermediate frequency band. The down-converted signal block issuing from the mixer is amplified by amplifier 55 and transmitted to the optical transmitter.

Figure 4:
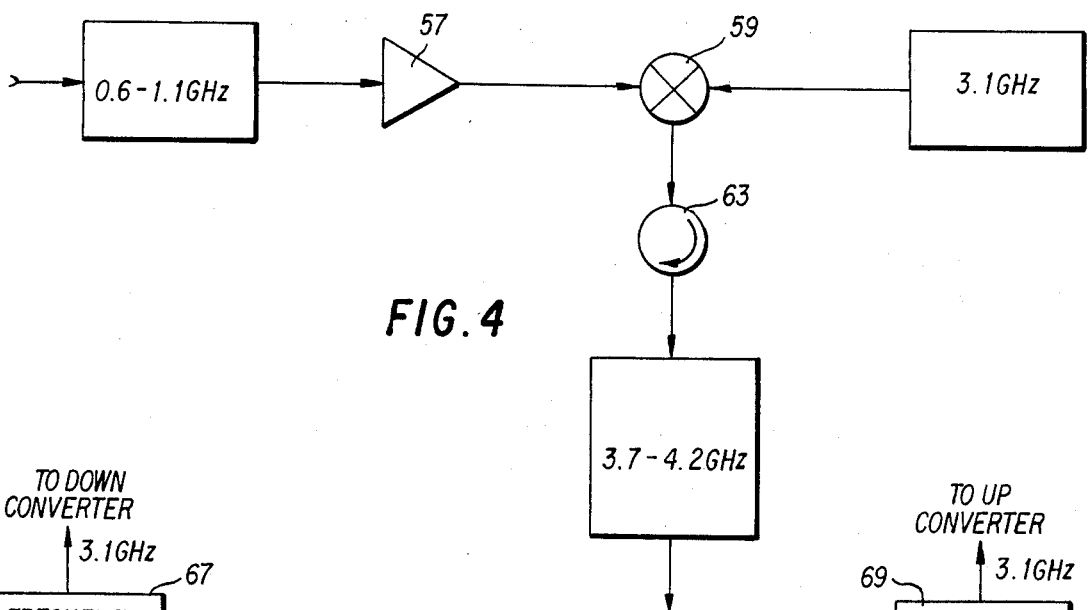
FIG. 4 is a block diagram of a block up-converter for use in the system of the invention.

FIG. 4 illustrates the second block conversion means used in the system of the invention. Amplifier 57 receives and amplifies the 0.6–1.1 GHz signal block transmitted from the optical receiver, and directs the amplified signals to mixer 59. The mixer combines the signal block with a signal from local oscillator 61 which has the same frequency as the signal generated by the local oscillator in the first block conversion means. This returns the signal block to its original frequency band. The signal block is directed to circulator 63 which minimizes reflections due to impedance mismatch over the operating frequency range. The signal block is then directed to the satellite receiver. As previously stated, it is possible to eliminate the second block conversion means from the system if the satellite receiver is equipped to handle the intermediate frequency signal block.

Figure 5:
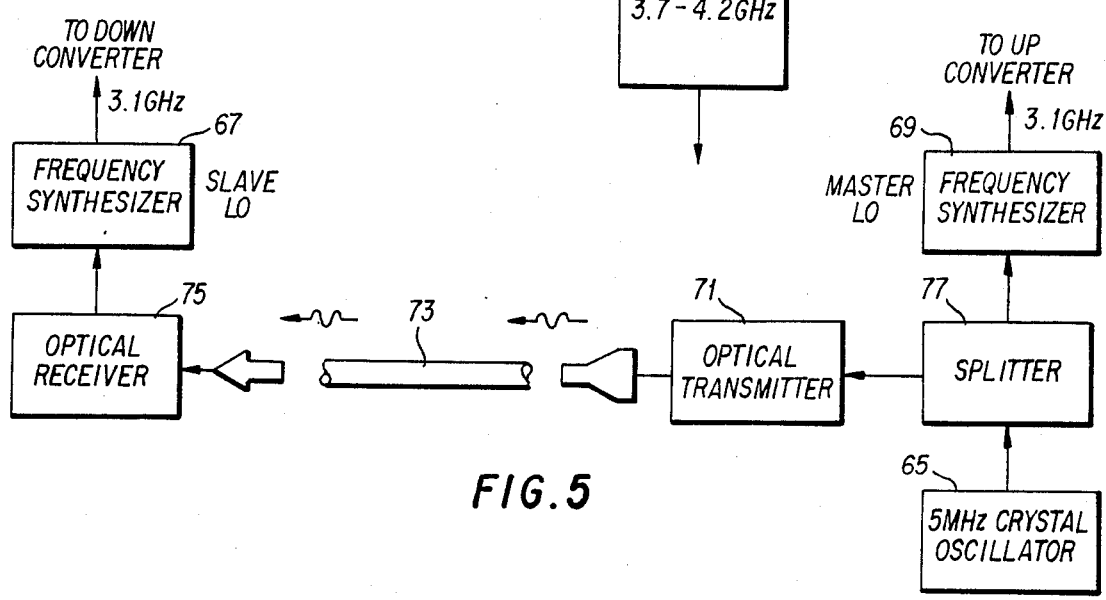
FIG. 5 is a block diagram of a preferred embodiment of the invention in which a fiber optic link is employed to synchronize the up and down block converters.

When first and second block conversion means are present, it is necessary to keep the local oscillators synchronized to assure clarity when the signal block is up-converted by the second block conversion means. A scheme for achieving synchronization is shown in FIG. 5. A single 5 MHz crystal oscillator 65 forms the reference signal for frequency synthesizer units 67 and 69, located at the first and second block conversion means, respectively. These units function as local oscillators for the first and second block conversion means. The reference 5 MHz TTL square wave generated by the crystal oscillator is transmitted to the slave frequency synthesizer 67 at the antenna end of the system via an inexpensive fiber optic link. The link is composed of optical transmitter 71, which is typically an inexpensive LED, optical fiber waveguide 73 and optical receiver 75, which is typically a PIN diode. The reference signal is split for transmission to the slave unit by splitter 77. The frequency mutlipliers 67 and 69 multiply the reference signal to obtain the appropriate frequency for mixing with the block, generally 3.1 GHz in a standard satellite transmission system.

The use of the synchronization scheme eliminates the problem of frequency drift between the two ends by insuring that the drift between the two local oscillators will be less than about 6 MHz over a temperature range of −40° to 60° C. In other words, while each local oscillator may drift to some slight extent, the difference between the frequency of each will never exceed about 6 MHz, in normal operating environments. While other means can be used to co-ordinate the frequency conversions, such as the use of temperature compensated crystal oscillators at both ends of the system, the synchronization scheme is preferred because it uses less expensive components.

While the system of the invention, as depicted in the Figures, is designed to transmit the maximum number of video channels which can be issued by a telecommunications satellite, i.e., two blocks of twelve video channels, it obviously can be used to transmit fewer channels, down to a single channel. In such systems, it may only be necessary to use a single transmission path rather than the two parallel paths for transmitting two signal blocks.

Moreover, while the system of the invention is especially suited for satellite television transmission, it has utility in data communications as well. However, due to the narrow bandwidth of the data channel as in SCPC (single channel per carrier) systems, the drift between the two local oscillators is more critical and thus demands tighter tolerances.

While the invention has now been described in terms of certain preferred embodiments, and exemplified with respect thereto, those of skill in the art will readily appreciate that various modifications, changes, omissions, and substitutions may be made without departing from the spirit of the invention. It is therefore intended that the present invention be limited solely by the scope of the following claims.

We claim:

1. A transmission system for satellite signals comprising:
   (i) a satellite antenna for receiving at least one block of frequency division multiplexed signals from a telecommunications satellite;
   (ii) a low noise amplifier for each block of signals received by said satellite antenna for amplifying said block of signals;
   (iii) first block conversion means associated with each low noise amplifier for converting the block of electrical signals into a frequency band of 0.6–1.1 GHz;
   (iv) a wideband fiber optical transmitting means connected to and driven by each first block conversion means and arranged for converting the input block of electrical signals into an analogous 0.6–1.1 GHz block of optical signals and further arranged to couple said optical signals into an appropriate transmission medium;
   (v) a wideband fiber optic link connected to each optical transmitting means as the medium for transmitting the 0.6–1.1 GHz block of signals;
   (vi) an optical receiving means connected to each wideband fiber optic link for receiving the transmitted 0.6–1.1 GHz block of signals and converting said signals into an analogous block of electrical signals; and
   (vii) a satellite receiver connected to each optical receiving means for receiving and converting the block of signals to a frequency band for subscriber use.

2. The system as defined by claim 1, further comprising second block conversion means associated with each wideband fiber optic link and satellite receiver for converting the 0.6–1.1 GHz frequency block of signals transmitted through the wideband fiber optic link to the original frequency band for reception by said satellite receiver.

3. The system as defined by claim 2, wherein said block conversion means are comprised of a local oscillator and signal mixing means.

4. The system as defined by claim 3, wherein the local oscillators in said first and second block conversion means are synchronized by synchronization means such that the drift between said local oscillators is less than 6 MHz over the temperature range −40° to +60° C.

5. The system as defined by claim 4, wherein said synchronization means comprises a crystal oscillator which generates a reference signal and splitting means which directs the reference signal into the local oscillator in either the first or second block conversion means and into a fiber optic link for transmission to the other local oscillator in the first or second block conversion means.

6. A transmission system for satellite television signals comprising:
   (i) a satellite antenna for receiving two blocks of television channels over a frequency band of 3.7–4.2 GHz from a telecommunications satellite, said blocks comprising a vertically polarized block of no more than twelve frequency division multiplexed television signals and a horizontally polarized block of no more than twelve frequency division multiplexed television signals;
   (ii) two low noise amplifiers, one for receiving and amplifying said vertically polarized block of signals, the other for receiving and amplifying said horizontally polarized block of signals;
   (iii) two first block conversion means, one for receiving the block of signals from one low noise amplifier and converting it into a frequency band of 0.6–1.1 GHz, the other for receiving the block of signals from the other low noise amplifier and converting it into a frequency band of 0.6–1.1 GHz;
   (iv) two wideband optical transmitting means respectively connected to said two first block conversion means for converting said blocks of electrical signals into analogous blocks of optical signals and further arranged to couple said respective blocks of optical signals into separate transmission media;
   (v) two wideband fiber optic links respectively connected to each of the optical transmitting means as transmission media for transmitting the 0.6–1.1 GHz blocks of signals from one of said first block conversion means, the other for transmitting the 0.6–1.1 GHz block of signals from said other first block of conversion means;
   (vi) two optical receiving means respectively connected to the two wideband fiber optic links for receiving and converting the 0.6–1.1 GHz blocks of optical signals into analogous blocks of electrical signals;
   (vii) two second block conversion means respectively connected to the two optical receiving means, one for receiving and converting the 0.6–1.1 GHz block of signals from one of said optical receiving means to the frequency band of 3.7–4.2 GHz, the other for receiving and converting the 0.6–1.1 GHz block of signals from the other of said optical receiving means to the frequency band of 3.7–4.2 GHz; and
   (viii) two receiver means, one for receiving and converting the block of signals from one of said second block conversion means to a frequency band for subscriber use, the other for receiving and converting the block of signals from the other of said second block conversion means to a frequency band for subscriber use.

7. The system as defined by claim 6, wherein said first and second block conversion means are comprised of a local oscillator and signal mixing means.

8. The system as defined by claim 7, wherein the local oscillators in each associate pair of first and second block conversion means are synchronized by synchronization means such that the drift between said local oscillators is less than about 6 MHz over the temperature range −40° to +60° C.

9. The system as defined by claim 8, wherein said synchronization means comprises a crystal oscillator which generates a reference signal, and splitting means which directs the reference signal into the local oscillator in either the first or second block conversion means and into a fiber optic link for transmission to the other local oscillator in the first or second block conversion means.

* * * * *